(12) United States Patent
Quader et al.

(10) Patent No.: US 12,541,716 B2
(45) Date of Patent: *Feb. 3, 2026

(54) CLASSIFICATION OF ERRONEOUS CELL DATA

(71) Applicant: INTERNATIONAL BUSINESS MACHINES CORPORATION, Armonk, NY (US)

(72) Inventors: Shaikh Shahriar Quader, Oshawa (CA); Piotr Mierzejewski, Markham (CA); Mona Nashaat Ali Elmowafy, Edmonton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 18/053,094

(22) Filed: Nov. 7, 2022

(65) Prior Publication Data

US 2023/0078134 A1 Mar. 16, 2023

Related U.S. Application Data

(63) Continuation of application No. 16/991,518, filed on Aug. 12, 2020, now Pat. No. 11,574,250.

(51) Int. Cl.
*G06F 17/00* (2019.01)
*G06F 18/211* (2023.01)
(Continued)

(52) U.S. Cl.
CPC ......... *G06N 20/00* (2019.01); *G06F 18/211* (2023.01); *G06F 18/214* (2023.01); *G06F 40/18* (2020.01)

(58) Field of Classification Search
CPC .......... G06N 20/00; G06N 7/01; G06F 40/18; G06F 18/211; G06F 18/214; H04L 63/1425
(Continued)

(56) References Cited

U.S. PATENT DOCUMENTS

2015/0142418 A1* 5/2015 Byron ............... G06F 40/40
704/9
2017/0116679 A1* 4/2017 Abraham ............ G06Q 40/10
(Continued)

FOREIGN PATENT DOCUMENTS

CN 110083826 A 8/2019

OTHER PUBLICATIONS

List of IBM Patents or Applications Treated as Related, Nov. 7, 2022, 2 pgs.
(Continued)

*Primary Examiner* — Jason T Edwards
(74) *Attorney, Agent, or Firm* — Rakesh Roy, Esq.; Matthew M. Hulihan, Esq.; Heslin Rothenberg Farley & Mesiti P.C.

(57) ABSTRACT

Classification of erroneous cell data includes using at least one transformation function, the at least one transformation function determined based on correlations of observed cell data to correct call data, to automatically generate training examples that correlate erroneous data values to correct data values as informed by the at least one transformation function; augmenting an initial training set of labeled training examples with the generated training examples to produce an augmented training set; and training a machine learning model using the augmented training set to classify observed cell data based on a comparison between the observed cell data and data that the machine learning model predicts.

17 Claims, 7 Drawing Sheets

(51) Int. Cl.
    *G06F 18/214*     (2023.01)
    *G06F 40/18*     (2020.01)
    *G06N 20/00*     (2019.01)

(58) Field of Classification Search
USPC .......................................................... 706/12
See application file for complete search history.

(56) References Cited

U.S. PATENT DOCUMENTS

| | | | |
|---|---|---|---|
| 2018/0270261 A1* | 9/2018 | Pande | G06N 7/01 |
| 2018/0285349 A1 | 10/2018 | Mineno et al. | |
| 2019/0332966 A1 | 10/2019 | Gidney | |
| 2020/0034436 A1 | 1/2020 | Chen et al. | |
| 2020/0136890 A1* | 4/2020 | To | H04L 43/0852 |
| 2021/0256214 A1 | 8/2021 | Gretz et al. | |
| 2022/0051126 A1 | 2/2022 | Quader et al. | |

OTHER PUBLICATIONS

Mell, Peter, et al., "The NIST Definition of Cloud Computing", NIST Special Publication 800-145, Sep. 2011, Gaithersburg, MD, 7 pgs.
R. Evtimov, et al., "Anti Social Online Behaviour Detection with BERT: Comparing Bidirectional Encoder Representations from Transformers (BERT) with DistilBERT and Bidirectional Gated Recurrent Unit (BGRU)", Seminar Information Systems (WS19/20), Feb. 7, 2020, 21 pgs.
S. Minaee, et al., "Deep Learning Based Text Classification: A Comprehensive Review", arXiv:2004.03705v1 Cs, vol. 1, No. 1, Apr. 6, 2020, 42 pgs.
X. Chu, et al., "Holistic data cleaning: Putting violations into context," in 2013 IEEE 29th International Conference on Data Engineering (ICDE), Apr. 2013, pp. 458-469, doi: 10.1109/ICDE.2013.6544847. Retrieved on Aug. 3, 2020 from the Internet URL: < https://cs.uwaterloo.ca/~ilyas/papers/XuICDE2013.pdf>.
T. Rekatsinas, et al., "HoloClean: holistic data repairs with probabilistic inference," Proc. VLDB Endow., vol. 10, No. 1, 2017, 12 pgs. Retrieved on Aug. 3, 2020 from the Internet URL: <http://www.vldb.org/pvldb/vol10/p1190-rekatsinas.pdf>.
A. Reddy et al., "Using Gaussian Mixture Models to Detect Outliers in Seasonal Univariate Network Traffic," in 2017 IEEE Security and Privacy Workshops (SPW), May 2017, pp. 229-234, doi: 10.1109/SPW.2017.9. Retrieved on Aug. 3, 2020 from the Internet URL: <https://ieeexplore.ieee.org/stamp/stamp.jsp?tp=&arnumber=8227312>.
C. Pit-Claudel, et al., "Outlier Detection in Heterogeneous Datasets Using Automatic Tuple Expansion," 2016, 14 pgs. Retrieved on Aug. 3, 2020 from the Internet URL: <https://dspace.mit.edu/bitstream/handle/1721.1/101150/MIT-CSAIL-TR-2016-002.pdf?sequence=1>.
F. Riahi, et al., "Model-based exception mining for object-relational data," Data Min. Knowl. Discov., vol. 34, No. 3, pp. 681-722, 2020, doi: 10.1007/s10618-020-00677-w. Retrieved on Aug. 3, 2020 from the Internet URL: <https://arxiv.org/pdf/1807.00381.pdf>.
Y. Liu, et al., "Generative Adversarial Active Learning for Unsupervised Outlier Detection," IEEE Trans. Knowl. Data Eng., 2019, doi: 10.1109/TKDE.2019.2905606, 13 pgs. Retrieved on Aug. 3, 2020 from the Internet URL: <https://arxiv.org/pdf/1809.10816.pdf>.
Z. Huang, et al., "Auto-Detect: Data-Driven Error Detection in Tables," in Proceedings of the 2018 International Conference on Management of Data, New York, NY, USA, 2018, pp. 1377-1392, doi: 10.1145/3183713.3196889, 16 pgs. Retrieved on Aug. 3, 2020 from the Internet URL: <https://rutgers-db.github.io/cs541-fall19/paper/cleaning-3.pdf>.
M. Dallachiesa, et al., "NADEEF: a commodity data cleaning system," in Proceedings of the 2013 ACM SIGMOD International Conference on Management of Data, New York, USA, 2013, pp. 541-552, doi: 10.1145/2463676.2465327, 12 pgs. Retrieved on Aug. 3, 2020 from the Internet URL: <https://cs.uwaterloo.ca/~ilyas/papers/NADEEFSigmod2013.pdf>.
I. Koumarelas, et al., "MDedup: duplicate detection with matching dependencies." VLDB Endowment, Jan. 1, 2020, 14 pgs. Retrieved on Aug. 3, 2020 from the Internet URL: <http://www.vldb.org/pvldb/vol13/p712-koumarelas.pdf>.
S. Schelter, et al., "Automating large-scale data quality verification," Proc. VLDB Endow., vol. 11, No. 12, pp. 1781-1794, 2018, 14 pgs. Retrieved on Aug. 3, 2020 from the Internet URL: <http://www.vldb.org/pvldb/vol11/p1781-schelter.pdf>.
E. Pena, et al., "Discovery of approximate (and exact) denial constraints", Proceedings of the VLDB Endowment, vol. 13, No. 3, 2019, pp. 266-278. Retrieved on Aug. 3, 2020 from the Internet URL: <http://www.vldb.org/pvldb/vol13/p266-pena.pdf>.
M. R. A. Rashid, et al., "Completeness and consistency analysis for evolving knowledge bases," J. Web Semant., vol. 54, pp. 48-71, 2019. Retrieved on Aug. 3, 2020 from the Internet URL: <https://arxiv.org/pdf/1811.12721.pdf>.
M. Farid, et al., "CLAMS: Bringing Quality to Data Lakes," in Proceedings of the 2016 International Conference on Management of Data, CA, 2016, pp. 2089-2092, doi: 10.1145/2882903.2899391. Retrieved on Aug. 3, 2020 from the Internet URL: <https://www.cc.gatech.edu/~xchu33/SIGMOD2016_demo.pdf>.
H. Saxena, et al., "Distributed Discovery of Functional Dependencies," in 2019 IEEE 35th International Conference on Data Engineering, Macao, 2019, pp. 1590-1593, doi: 10.1109/ICDE.2019.00149. Retrieved on Aug. 3, 2020 from the Internet URL: <https://cs.uwaterloo.ca/~h2saxena/fd_discovery.pdf>.
E. K. Rezig, et al., "Pattern-Driven Data Cleaning," ArXiv171209437 Cs, 2017, 13 pgs. Retrieved on Aug. 3, 2020 from the Internet URL: <https://arxiv.org/pdf/1712.09437.pdf>.
A. Qahtan, et al., "Pattern functional dependencies for data cleaning," Proc. VLDB Endow., vol. 13, No. 5, pp. 684-697, 2020. Retrieved on Aug. 3, 2020 from the Internet URL: <http://da.qcri.org/ntang/pubs/pfds.pdf>.
K. Chowdhury, "Supervised Machine Learning and Heuristic Algorithms for Outlier Detection in Irregular Spatiotemporal Datasets," J Env. Inf., vol. 33, 2019, 16 pgs. Retrieved on Aug. 3, 2020 from the Internet URL: <file:///C:/Users/spl/Downloads/SupervisedMachineLearningandHeuristicAlgorithmsforOutlierDetectioninIrregularSpatio-TemporalDatasets.pdf>.
A. Vaswani et al., "Attention is All you Need," in Advances in Neural Information Processing Systems, Curran Associates, Inc., 2017, pp. 5998-6008. Retrieved on Aug. 3, 2020 from the Internet URL: <https://arxiv.org/pdf/1706.03762.pdf>.
J. Devlin, et al., "BERT: Pre-training of Deep Bidirectional Transformers for Language Understanding," ArXiv181004805 Cs, 2019, 16 pgs. Retrieved on Aug. 3, 2020 from the Internet URL: <https://arxiv.org/pdf/1810.04805.pdf>.
D. Hendrycks, et al., "Gaussian Error Linear Units (GELUs)," ArXiv160608415 Cs, 2018, 9 pgs. Retrieved on Aug. 3, 2020 from the Internet URL: <https://arxiv.org/pdf/1606.08415.pdf>.
J. T. Hancock, et al., "Survey on categorical data for neural networks," J. Big Data, vol. 7, No. 1, 2020, doi: 10.1186/s40537-020-00305-w, 41 pgs. Retrieved on Aug. 3, 2020 from the Internet URL: <https://journalofbigdata.springeropen.com/track/pdf/10.1186/s40537-020-00305-w>.
H. Nam, et al., "Batch-Instance Normalization for Adaptively Style-Invariant Neural Networks," in Advances in Neural Information Processing Systems, Curran Associates, Inc., 2018, 12 pgs. Retrieved on Aug. 3, 2020 from the Internet URL: <https://arxiv.org/pdf/1805.07925.pdf>.
J. Wei, et al., "EDA: Easy Data Augmentation Techniques for Boosting Performance on Text Classification Tasks," ArXiv190111196 Cs, Aug. 2019, 9 pgs. Retrieved on Aug. 3, 2020 from the Internet URL: <https://arxiv.org/pdf/1901.11196.pdf>.
A. Heidari, et al., "HoloDetect: Few-Shot Learning for Error Detection," in Proceedings of the 2019 International Conference on Management of Data, Netherlands, 2019, pp. 829-846, doi: 10.1145/3299869.3319888. Retrieved on Aug. 3, 2020 from the Internet URL: <https://arxiv.org/pdf/1904.02285.pdf>.
F. Neutatz, et al., "ED2: A Case for Active Learning in Error Detection," in Proceedings of the 28th ACM International Confer-

(56) References Cited

OTHER PUBLICATIONS ence on Information and Knowledge Management, New York, USA, 2019, pp. 2249-2252, doi: 10.1145/3357384.3358129. Retrieved on Aug. 3, 2020 from the Internet URL: <file:///C:/Users/spl/Downloads/CIKM_ed2_new.pdf>.
Crane, D., "The Cost of Bad Leads: A Report," Integrate, Inc., 2017, 52 pgs. Retrieved on Aug. 3, 2020 from the Internet URL: <https://demand.integrate.com/rs/951-JPP-414/images/Integrate_TheCostofBadLeads_Whitepaper.pdf>.
D. W. Cearley, "Top 10 Strategic Technology Trends for 2020," Gartner, 2020, 2 pgs. Retrieved on Aug. 3, 2020 from the Internet URL: <https://www.gartner.com/en/publications/top-tech-trends-2020>.
D. Dua, et al., UCI Machine Learning Repository, University of California, Irvine, School of Information and Computer Sciences, 2017, 2 pages. Retrieved on Aug. 3, 2020 from the Internet URL: <https://archive.ics.uci.edu/ml/index.php>.
A. Sternberg, et al., "A Review on Flight Delay Prediction," ArXiv170306118 Cs, 2017, 21 pgs. Retrieved on Aug. 3, 2020 from the Internet URL: <https://arxiv.org/pdf/1703.06118.pdf>.
E. H. M. Pena, et al., "Discovery of Approximate (and Exact) Denial Constraints," Proc. VLDB Endow., vol. 13, No. 3, pp. 266-278, 2019, doi: 10.14778/3368289.3368293. Retrieved on Aug. 3, 2020 from the Internet URL: <http://www.vldb.org/pvldb/vol13/p266-pena.pdf>.
S. Krishnan, et al., "ActiveClean: Interactive Data Cleaning for Statistical Modeling," Proc. VLDB Endow., vol. 9, No. 12, pp. 948-959, 2016, doi: 10.14778/2994509.2994514. Retrieved on Aug. 3, 2020 from the Internet URL: <https://www.cs.sfu.ca/~jnwang/papers/vldb2016-activeclean.pdf>.

\* cited by examiner

| Industry | State | Revenue | Years-in-business | |
|---|---|---|---|---|
| IT | New York | $1000 | 5 | |
| Medical | Massachusetts | $5000 | 2 | |
| Banking | Virginia | $10000 | 3 | |
| . . . | . . . | . . . | . . . | |

FIG. 2

CLASSIFICATION OF ERRONEOUS CELL DATA

BACKGROUND

Data cleansing refers to the process of identifying and rectifying erroneous (inaccurate, corrupted, missing, etc.) records in databases. In a typical approach, erroneous data cells—those that contain erroneous data—are identified and then data correction routine(s) are applied to fix or remove the erroneous data. Such data cleaning can be important to businesses employing data-oriented approaches that involve predictive models and/or analytic systems critical to business innovation, as examples.

SUMMARY

Shortcomings of the prior art are overcome, and additional advantages are provided through the provision of a computer-implemented method. The method uses at least one transformation function, the at least one transformation function determined based on correlations of observed cell data to correct call data, to automatically generate training examples that correlate erroneous data values to correct data values as informed by the at least one transformation function. The method additionally augments an initial training set of labeled training examples with the generated training examples to produce an augmented training set. Further, the method trains a machine learning model using the augmented training set to classify observed cell data based on a comparison between the observed cell data and data that the machine learning model predicts.

Further, a computer system is provided that includes a memory and a processor in communication with the memory, wherein the computer system is configured to perform a method. The method uses at least one transformation function, the at least one transformation function determined based on correlations of observed cell data to correct call data, to automatically generate training examples that correlate erroneous data values to correct data values as informed by the at least one transformation function. The method additionally augments an initial training set of labeled training examples with the generated training examples to produce an augmented training set. Further, the method trains a machine learning model using the augmented training set to classify observed cell data based on a comparison between the observed cell data and data that the machine learning model predicts.

Yet further, a computer program product including a computer readable storage medium readable by a processing circuit and storing instructions for execution by the processing circuit is provided for performing a method. The method uses at least one transformation function, the at least one transformation function determined based on correlations of observed cell data to correct call data, to automatically generate training examples that correlate erroneous data values to correct data values as informed by the at least one transformation function. The method additionally augments an initial training set of labeled training examples with the generated training examples to produce an augmented training set. Further, the method trains a machine learning model using the augmented training set to classify observed cell data based on a comparison between the observed cell data and data that the machine learning model predicts.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

FIG. 2 depicts a portion of an example table of data;

DETAILED DESCRIPTION

Figure 1A:
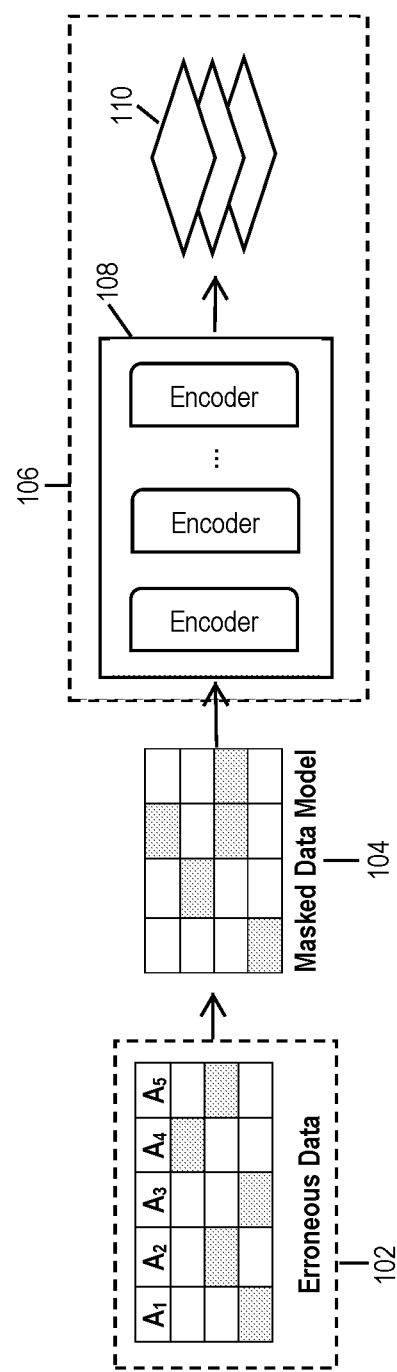
FIGS. 1A-1B depicts an example component overview of a framework for classification of erroneous cell data in accordance with aspects described herein.

Described herein are approaches for erroneous data classification which could be implement as part of a data cleansing approach. As noted above, data cleaning can be important to businesses employing data-oriented approaches that involve predictive models and/or analytic systems critical to business innovation. Nevertheless, errors such as syntax errors, type conversion, and duplicates (as examples) can originate from heterogeneous data sources. Error detection can be challenging especially when dealing with 'big data' (e.g., potentially hundreds of columns and billions of rows). This makes manual error detection and repairing prohibitively expensive, resource-consuming, and practically impossible.

Poor data quality is considered a primary problem affecting machine learning and analytics practices. So-called "garbage-in, garbage-out" presents an ongoing problem for machine learning models, and inaccurate data can lead to severe consequences for businesses. Therefore, error detection is often considered a critical feature and step in maintaining a stable analytics pipeline.

Conventional approaches for detecting erroneous data are usually targeted to detecting specific type(s) of data errors. Example targeted types of data errors include outlier detection, rule violation, and duplicate data detection. Furthermore, rule-based systems count on the identification of a set of data quality rules using integrity constraints to specify functional dependencies or any other constraints that may define data quality in the given context.

Detection of erroneous cell data can be seen as a binary classification problem. Erroneous cell data refers to error(s) with respect to data of a data cell of a table. Example types of erroneous data include (i) a missing value, where a cell is expected to contain a value but there is no value in the cell and (ii) an incorrect value in a cell. Cell data of a cell can be classified in a binary manner, i.e. whether or not an observed value of the cell is correct. If not, it is erroneous. If a cell is empty where it should contain a value, this can be deemed erroneous cell data.

A learning model can be trained to differentiate faulty (erroneous) values from correct ones. For example, the full expressive power of sophisticated models such as neural networks can overcome a problem of error heterogeneity and detect multiple classes of errors. Additionally, the learning model can automate the process of error detection without compelling or requesting any input parameters (quality rules, outlier thresholds, etc.) from a user.

Neural networks equipped with some kind of attention mechanism can capture data errors because attentive models can see through noise in the data and focus on the relevant information. An attention mechanism ('transformer') proposed in a network architecture can perform well on its own without the need for additional algorithms, such as recurrent neural networks. Significant improvements in transformers have been achieved in language understanding tasks.

Described herein is a learning model that can capture dependencies between attributes (e.g. column data) and understand cell context, which refers to a context in which a given cell of a table is present. The context includes attributes ('before' cell data and 'after' cell data) for an entity (e.g. table row) in which the given cell is present.

Figure 1B:
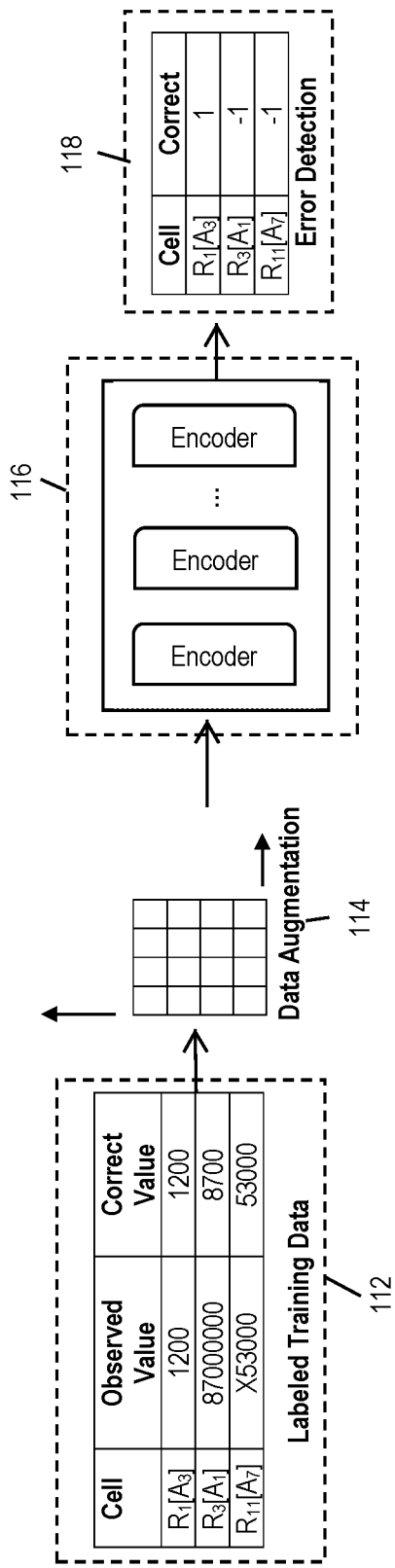

FIGS. 1A-1B depicts an example component overview of a framework for classification of erroneous cell data in accordance with aspects described herein. The framework includes two main phases, with the first of the two phases being presented in connection with FIG. 1A and the second of the two phases being presented in connection with FIG. 1B. Referring initially to FIG. 1A, the first phase applies a masked data model 104 against an input dataset 102, which is selected for analysis to determine which of its cell data is erroneous. The phase also implements unsupervised pre-training 106 via one or more encoders 108 to learn a data representation 110. The input dataset 102 is an initial dataset (perhaps after some preprocessing such as column joining) that includes, in this example, some erroneous cell data. However, it is not known at this point whether, or which, cell data is actually erroneous. Typically in a large dataset it is the case that some cell data is erroneous, gives rise to the need for proper data cleansing operations in the first place. An objective of the framework of FIG. 1A-1B is to classify the cell data of cells of the dataset as being erroneous or not.

In this first phase, unsupervised pre-training of a machine learning model is performed to learn a data representation 110 of data cells of the input dataset 102. The input dataset 102 is (or includes) tabular data, in some examples. In some embodiments, the data representation 110 is a bidirectional encoder representation of the data cells in the tabular data of the input dataset 102. The pre-training 106 includes training the machine learning model to predict cell data based on entity attributes. For an entity (e.g. row) of input data, then any given cell in that row holds data for a given attribute (column) of that entity. The data values in other cell(s) (i.e. data for other attributes of that entity), such as those before and after the given cell of that row, could be used to infer or predict the value of the given cell. In this manner, the learned data representation can inform the prediction of a cell value of a cell of an entity based on values of other cells for that entity. The machine learning model can be used to predict data for any of the cells in the table, rather than relying on a separate model for each cell in the table. The term 'pre-training' is used in this aspect because it is prior to training described with reference to the second phase (FIG. 1B), which trains the model to recognize the validity of a given prediction and therefore whether or not actual observed data (i.e. data of a given cell in the input dataset) is erroneous—that is, it fails to match what is predicted by the model.

In the first phase, a bidirectional encoder representation model (sometimes referred to as BERT) is trained by randomly replacing a percentage of the input features (specific cell data of the input data) with a mask as informed by the masked data model 104. One or more cells of the input dataset are selected and masked, and the machine learning model is trained to predict the value(s) of the masked cell(s) from (i.e. based on) the original values of the features. For instance, for each masked cell, training the machine learning model trains it to predict cell data for that masked cell given cell data for other attributes of an entity to which the cell corresponds. The result is a bidirectional pre-trained model learning the data representation and approximating the distribution on the attribute level.

By way of specific example, reference is made to FIG. 2, which depicts a portion of an example table of data. The example of FIG. 2 depicts just a few entities (rows) and attributes (columns) of table 200. In practice, the input dataset is typically significantly larger, potentially encompassing millions or billions of datapoints (cells) across potentially thousands or millions of rows and tens or hundreds of columns, as examples.

The example of FIG. 2 shows four columns corresponding to the four attributes Industry, State, Revenue, and Years-in-business, and four rows, the first of which (202a) is a header row indicating the attribute headings. There are three entities (corresponding to rows 202b, 202c and 202d) below the header row 202a, with each entity having values for each of the four attributes Industry, State, Revenue, and Years-in-business, for a total of 12 cells relevant to this aspect of the disclosure. An example of the above-discussed masking selects to mask two of these 12 cells. The selected two cells are cell 204a (the revenue value for the first entity) and cell 204b (the years-in-business value for the third entity) in this example.

Since phase 1 involves unsupervised learning, dependency rules are derived, rather than relying on labels being provided by a user. In practical examples, dependency rules can be generated based on the masking and consideration of tens or hundreds (or more) cells. For purposes of illustration and not limitation, an example dependency rule derived from the masking of cell 204a is represented as: (Industry=IT, Years-in-business=5)→(Revenue=$1000). In this basic example, the model learns to predict that when an entity's industry is IT and number of years-in-business is 5, then revenue is $1000. The dependency rule relates a set of given input attributes for an entity, as input (e.g. Industry=IT, Years-in-business=5), to a predicted data value, as output, for another attribute of that entity (i.e. Revenue=$1000). Training the machine learning model to predict cell data generates dependency rules of this nature.

As noted, in practical examples, there will likely be many examples and masked cells behind the generation of a dependency rule, and the prediction function may be significantly more sophisticated. Additionally, the model is trained to predict cell data, however the predictions are not givens. They are instead outputs that the model has been trained to provide based upon, and consistent with, what has been observed in that dataset. The issue of whether the predicted values are accurate (correct), and how to predict correct values, is addressed by phase two.

Returning to the example of FIG. 2, another dependency rule, generated based on the masking of cell 204b, is expressed as: (Industry=Banking, Revenue=$10000)→

(Years-in-business=3) as a predicted output. Both of the example dependency rules reflect training of the model to predict values for cells (e.g. the masked cells) based on original values in the dataset.

The second phase includes erroneous data detection and fine-tuning of the end-to-end parameters of the model. To minimize the manual effort to provide training data, the framework applies a data augmentation approach to take a set of correct data points (i.e. labeled inputs that include an observed value and a correct value) and return a set of additional examples that indicate an erroneous cell data value and a correct cell data value to which it corresponds. Referring to FIG. 1B, an initial training set 112 is obtained for training the machine learning model to classify cell data. The initial training set 112 includes labeled training data/examples, or 'ground truths', each of which correlates an example observed cell data value to a correct cell data value. Sometimes the observed and correct values are the same, which emphasizes the correctness of the observed value in that case. In other examples, the observed value is an erroneous value and the correct value is given. A process applies data augmentation 114 to augment the initial training set 112 with additional examples to produce an augmented training set. The additional examples represent additional 'ground truths', and thus the data augmentation can help reduce or minimize the amount of necessary hand-labeled samples 112.

A process automatically augments the initial training set to produce the augmented training set by identifying patterns in the labeled training examples 112 and generating from the identified patterns transformation functions for augmenting the initial training set. Then, using the transformation functions, the process learns an augmentation strategy and automatically generates additional training examples that correlate erroneous data values to correct data values as informed by the transformation functions.

The transformation functions may also be referred to herein as data augmentation rules or patterns. As noted, there are generated based on the input labeled training examples 112. The labeled training examples may be received from a domain expert or other source with knowledge about the data of the dataset (102). The transformation functions/data augmentation rules are used to 'inject' additional examples of erroneous data values together with their correct data value counterparts, creating more examples of truths for training the model. After data augmentation, the framework fine-tunes the model (116) via one or more encoders using the augmented training set. The fine-tuning trains the model to classify data points as being erroneous or not erroneous. This is in contrast to the pre-training in the first phase, which trains the model to make a guess (prediction) for a cell data value given the dependency rules. The second phase trains the model to indicate whether an observed value is erroneous or not. A tuned model can output a classification for each cell data value of the initial dataset (e.g. the input dataset 102), indicating whether each given cell data value is erroneous cell data or correct cell data.

Thus, based on training the machine learning model using the augmented training set to classify observed cell data based on a comparison between the observed cell data and data that the machine learning model predicts, a process can classify observed cell data in cell(s) of the input dataset, where the classifying includes, for each such cell of the cell(s), (i) predicting cell data for that cell, (ii) comparing the predicted cell data to the observed cell data in that cell, and (iii) identifying from the comparing whether the observed cell data is erroneous.

By way of specific example to illustrate some aspects of this phase two, reference is again made to data of the example table 200 of FIG. 2. Assume that received labeled training data includes the following presented in table 1:

TABLE 1

| Observed Value | Correct Value |
| --- | --- |
| Revenue = $1000 | Revenue = $1500 |
| Years = 3 | Years = 3 |
| State = Massachusets | State = Massachusetts |

Each of the last three rows of Table 1 are a respective example of a labeled training data point.

An example transformation function based on the first labeled example (Observed: Revenue=$1000; Correct: Revenue=$1500) may be expressed as 'subtract $500 from revenue to produce an erroneous observed value', or stated differently: 'observed/erroneous cell data=correct cell data−$500'. This function produces an erroneous observed revenue number by subtracting $500 from the correct revenue number. Again, this is a basic example to illustrate principles described herein.

Another example transformation function, based on the third labeled example, is 'Observed:State=Masachusets→Correct: State=Massachusetts'. This corrects a misspelling of the state 'Massachusets' to the proper spelling of 'Massachusetts'. A more general transformation function based on this labeled example may be 'If State value contains two consecutive instances of a given letter, drop one of those two instances'. This function produces an erroneous observed State value by dropping one instance of a consecutively-appearing letter.

Two automatically generated additional training examples that could be generated from the above two transformation functions are presented in Table 2:

TABLE 2

| Observed Value | Correct Value |
| --- | --- |
| Revenue = $2500 | Revenue = $3000 |
| State = Otawa | State = Ottawa |

Learning the augmentation strategy determines how to apply the transformation functions to data of the labeled training examples. Generating a transformation function of the transformation functions includes extracting, based on examining one or more of the labeled training examples, a function that operates on correct cell data to produce observed cell data (i.e. example erroneous data). Using the examples above, a correct revenue value of $3000 is transformed by subtracting $500 to produce the erroneous data value $2500, and a correct spelling of the locale Ottawa is transformed to produce the erroneous value of Otawa.

Automatically generating each additional training example includes applying one or more transform functions to a selected correct data value, for instance one that the process selects for which an erroneous data point is to be generated, according to the learned augmentation strategy to transform the selected correct data value to an erroneous data value. Then, the erroneous data value is correlated to the selected correct data value to provide the additional training example. In the above, $3000 (a 'correct' data value) is reduced by $500 to produce $2500 (an 'erroneous' data value).

With the model built and trained, a process can classify data of cells of the input dataset and produce an output data structure (e.g. 118 of FIG. 1B) that indicates, for each of one or more cell(s) of the dataset, a value that indicates that the cell data of the cell is erroneous, or a value that indicates that the cell data of the cell is correct.

Accordingly, an end-to-end framework is provided for self-supervised learning for structured data. A system and process can apply bidirectional encoder representations to model the data of an input dataset and, after model building and training, detect erroneous values in the dataset. A proposed architecture includes a data augmentation module. In some embodiments, no user-defined parameters are needed, as it may be fully-automated and assume no domain-specific knowledge. Instead, transformation functions and the augmentation strategy are concluded from the input data itself.

By way of specific example, an architecture in accordance with aspects described herein uses bidirectional encoder representations with Gaussian Error Linear Unit (GELU) activation functions. The model uses the encoder architecture with multi self-attention layers to capture the relationships between the cells in each tuple (i.e. row) and make use of the tuple-level representation. First, the model applies a self-supervised learning task during a first phase to improve the performance of erroneous data detection. To train the model, a Masked Data Model (MDM) pre-training objective is utilized. Given a set of data cells forming a given tuple $C_l$, a process replaces a portion of the input cells with a special mask (or at least selects cells to be masked). Then the model is trained to predict values for the masked cells. Using this objective, for supervised fine-tuning the model learns the task of erroneous data detection with the help of a labeled dataset $D_t$. To tackle the problem of imbalanced data, the data augmentation approach is used to generate additional, 'synthetic' examples. Although transformers are sometimes coupled with language modeling, applying bidirectional transformer training can provide a deeper understanding of data context. The following presents further details for aspects of the two phases discussed above.

One aim is to classify the erroneous values in a database/dataset. Relational databases include a set of tables, with each table D having of a set of attributes $\{a_i\}_{i=1}^{N}$ (columns) and tuples $\{t_i\}_{i=1}^{M}$ (rows). Each tuple l includes a set of cells C as $C_l=\{l[a_1], l[a_2], \ldots l[a_N]\}$ where $C_l$ denotes the cells in a given tuple l, and $l[a_i]$ is the value of the $i^{th}$ attribute in l. Since erroneous entries originate from assigning incorrect or no values to cells, it can be assumed that each cell c∈C has an unknown correct value $\overline{v}_c$ and an existing observed value $v_c$. Then, for each cell c∈C, a cell c is said to be erroneous if $\overline{v}_c \neq v_c$.

Moreover, the model employs a training dataset $D_t$ in the second phase for supervised fine-tuning. The training dataset can be denoted as $\{x_i, y_i\}_{i=1}^{k}$, where $x_i$ depicts a set of features for a given cell status as $\{c_i, v_{c_i}, \overline{v}_{c_i}\}$ (where $c_i$ is cell identifier, $v_{c_i}$ is observed value, $\overline{v}_{c_i}$ is correct value) to express the observed and the correct values for the $i^{th}$ cell c as $\{c_i\}_{i=1}^{k}$ is a subset of C. $y_i \in \{-1,1\}$ represents the output label. Generally, given a database table D and a training dataset $D_t$, a goal of the proposed model is to classify each cell value in C by assigning a binary flag to denote $c_i$ having a correct value {1} or an erroneous one {−1}.

Example aspects of a specific process to implement the first phase are presented as follows. During data collection of initial data, which may be processed into an input dataset 102, a method first employs the foreign key constraints described in the database to populate the referenced columns and join the existing table with all of its related entities. This allows the solution to learn from data spread across multiple tables in the database that are related to each other. The foreign key constraints inform which columns across the tables to join to produce the input dataset.

In some embodiments, a user can review the candidate tables that this part of the process has identified for join. The user could provide input on how to join the candidate tables (e.g. left outer join, inner join, etc.) or remove a table from the learning process, for instance, such as when a table in the set of join candidates is not critical for the particular application.

For unsupervised pre-training, the model operates on a sequence of values $\{l[a_1], l[a_2], \ldots l[a_N]\}$ representing the cells in a tuple l. To accommodate tabular data, an encoder can directly process cells with continuous values without modification. Cells with a categorical value (like a string value) can be mapped using trainable embeddings which assigns unique numerical values for these categorical values.

To accelerate the training phase, the framework can apply a preliminary step of instance normalization to standardize the input. Then an attentive transformer may be utilized to model the dependencies between the attributes. As described above, training the machine learning model to predict the cell data includes generating dependency rules, with each dependency rule relating a set of given input attributes for an entity, as input, to a predicted data value, as output, for another attribute of that entity.

The input embeddings can be passed to a 'multi-head' attention, followed by a layer of a feed-forward network. The input is first fed to the first encoder and these are then propagated to the following encoder layer. Specifically, first, to encode the input, multi-head attention followed by a layer of a feed-forward network is used, as mentioned. In an example implementation, the number of transformer blocks (layers) L is 6, and the number of self-attention heads h is 12. However, these hyperparameters can be tuned as desired for other models.

As a self-supervised objective, presented is the task of the masked data model. Any desired amount or number of cells of the input data may be masked. In a specific example, 15% of the cells in each instance are selected at random to mask, and each masked cell may be replaced by a special symbol (such as [M]). Then, the network is trained to predict the masked cells, i.e. to predict a cell value—the value observed from that cell—based on its context. As the encoder processes the inputs to produce a set of representations, the encoding at different levels of transformer is computed as $h_i=\text{transformer}(h_{i-1}) \forall i \in [1, L]$, where L is the number of transformer layers.

Example aspects of a specific process to implement the second phase are presented as follows. After training the initial model in phase one, the second phase aims at fine-tuning the learning parameters to the target task of erroneous data detection. The self-supervised task facilitates obtaining a bidirectional pre-trained model. During phase two, the trained model accepts a labeled dataset to fine-tune the parameters of the model. Therefore, $\{x_i\}_{i=1}^{K}$ in $D_t$ are fed as inputs, and the ground-truth labels $\{y_i\}_{i=1}^{K}$ are plugged into an output layer for erroneous cell classification. As a result, the activation function of the final transformer block $h_H$ goes through a linear adder layer to predict y.

The labeled dataset $D_t$ is utilized in this step for supervised fine-tuning. Given the fact that errors in datasets are often limited, the collected, labeled data is usually highly imbalanced. Since machine learning models tend to treat the minority class as noise and ignore it, this can harmfully affect the classification performance. To mitigate the imbalance risk, a preliminary stage of data augmentation is performed before fine-tuning the model. During such a stage, more synthetic labeled points are generated without the need for manual labeling.

Training neural networks with small unbalanced datasets can lead to overfitting, a condition in which the network only commits to the training examples. As a result, overfitting can lead to poor performance when generalizing to unseen data points. Therefore, data augmentation is employed to add more erroneous data points during fine-tuning. In accordance with these aspects, an initial training set is automatically augmented to produce an augmented training set. This includes, as explained in further detail below, identifying patterns in the labeled training examples and generating from the identified patterns transformation functions for augmenting the initial training set, and then, using the transformation functions, learning an augmentation strategy and automatically generating additional training examples that correlate erroneous data values to correct data values as informed by the transformation functions, where the augmented training set includes the labeled training examples of the initial training set and the generated additional training examples.

Accordingly, an aspect specifies of a set of transformation functions T that, when applied to correct values, can generate erroneous ones as $v_{c_i} = f(\bar{v}_{c_i})$. To decide on which transformations should be used for which value, a strategy of error generation $S_{EG}$ is determined. Once both T and $S_{EG}$ are specified, the model can start learning additional training examples from $D_T$. Learning the augmentation strategy therefore determines how to apply the transformation functions to data of the labeled training examples.

By way of example, this stage starts by applying a pattern matching approach to determine the set of transformations T. The approach iteratively examines each of the labeled examples $\{c_i, v_{c_i}, \bar{v}_{c_i}\}$ and extracts all possible transformations ("transformation functions") $f \in T$ which could be applied to $\bar{v}_{c_i}$ ('correct' cell data) to produce the observed value $v_{c_i}$ so that $v_{c_i} = f(\bar{v}_{c_i})$.

As examples, some/all $f \in T$ can employ one of the following operations:
Character Random Replacement—Randomly select a character in $\bar{v}_{c_i}$ and replace it with another character that is chosen from the alphabet at random;
Character Random Insertion—Select a position in $\bar{v}_{c_i}$ at random and insert an additional character in that position;
Character Random Deletion—Choose a random character in $\bar{v}_{c_i}$ and remove it;
Character Random Swapping—Swap two characters in $\bar{v}_{c_i}$ chosen at random Given these (or other desired) operations, a generative process from $D_T$ is articulated to introduce errors via data augmentation. The process extracts a set of transformations from each labeled example $D_T$. The learning process finds the similarity between $v_{c_i}$ and $\bar{v}_{c_i}$ in each instance in $D_T$, for instance by applying the Gestalt Pattern Matching algorithm as one example. The model returns the longest common substring found in $v_{c_i}$ and $\bar{v}_{c_i}$. Then, it recursively returns the matching characters in the non-matching regions on both sides of that substring. The model then extracts the transformations by examining the overlap between the matching substrings and match it with the set of available operations.

Therefore, given the extracted transformations T, the model learns $S_{EG}$ by calculating the empirical distribution of these transformations. Then, to derive the conditional probability distribution $P(T|\bar{v}_{c_i})$ given a correct cell value $\bar{v}_{c_i}$, the model finds all transformation functions in T as $f(\overline{str}) = str$, such that str can be seen as a subset of $\bar{v}_{c_i}$. Next, the maximum and minimum of the empirical probabilities of these functions is considered to normalize the empirical probability $P(f)_{f \in T}$. Furthermore, the conditional probability can be formally denoted as $$P(f \mid \bar{v}_{c_i}) = \frac{P(f) - \min\left(P(f_{\bar{v}_{c_i}})_{f \in T}\right)}{\text{norm}},$$

where $\text{norm} = \max\left(P(f_{\bar{v}_{c_i}})_{f \in T}\right) - \min\left(P(f_{\bar{v}_{c_i}})_{f \in T}\right)$.

The model employs the conditional distribution $P(T|\bar{v}_{c_i})$ along with the learned transformations T described above to sample the correct training examples from $D_T$. Hence, for each collected example in $D_T$, the process samples a transformation f according to $P(T|\bar{v}_{c_i})$ and applied to the correct value in that example $\bar{v}_{c_i}$ to augment additional erroneous data points. The newly noisy value $v_{c_i} = f(\bar{v}_{c_i})$ is added to $D_T$ as $D_T = D_T \cup \{c_i, v_{c_i}, \bar{v}_{c_i}\}$.

In this manner, the machine learning model is trained, using the augmented training set, to classify observed cell data based on a comparison between the observed cell data and data that the machine learning model predicts. An example process classifies (by applying the model to an input dataset) observed cell data in one or more cells of the dataset. The classifying includes, for each cell of the one or more cells, predicting cell data for that cell, comparing the predicted cell data to the observed cell data in that cell, and identifying from the comparing whether the observed cell data is erroneous.

As noted herein, 'erroneous cell data' can encompass the situation where a cell contains no data, i.e. 'observed cell data' of the cell is missing. Based on observed cell data of a cell of the dataset being missing, such that the cell has no cell data, and based further on the machine learning model predicting some cell data for that cell, classifying the observed cell data of the cell can classify the cell data of the cell to be erroneous in that case.

In some practical examples, the input dataset includes thousands, millions, or billions of cells, hundreds, thousands, or millions of entities (rows), and hundreds or thousands of columns. A dependency rule can be generated based on dependencies and/or characteristics observed across multiple entities—possibly tens or hundreds—to inform the dependency rule. The dependency rule could identify a specific value as output (as in the examples above) or a range of predicted values, such as 'Revenue[$960, $1020]' to indicate a range of predicted correct values for a cell. Transformation function generation can be based on the identification of pattern(s) from one or more labeled training examples. For example, a pattern may be identified from the observation of tens or hundreds of training examples. The transformation function could transform a selected correct value to a range of possible erroneous values. For instance, an example transformation function could be 'observed/erroneous cell data=correct cell data-[$473,$502]' to indicate that an erroneous cell data value in the range $473 to $502 (inclusive) less than the correct cell data is to correlate to the specific correct cell data value.

Aspects described herein differ from conventional approaches applying rule-based methods that rely on a set of data quality rules and use them to specify data cells that violate these rules. Denial constraints can be used to determine data quality rules in the form of first-order formulae that incorporate different types of integrity constraints. These constraints can be either supplied by domain experts or automatically derived from the data. Consequently, some conventional tools focus on analyzing these constraints and defining data inconsistencies with them. In a specific example, a declarative API is proposed that allows the user to define database constraints. Then, it executes an algorithm for constraint validation to detect violating data. Similarly, another approach follows the same pipeline of collecting user-specified constraints and then compiling constraints to detect erroneous data and choose the most appropriate data repairing algorithm. However, all the aforementioned conventional approaches solutions still require some input from the end-user. For example, they oblige the user to write a set of integrity constraints, such as denial constraints and check constraints. Writing integrity constrains requires an adequate level of domain knowledge alongside the technical knowledge needed to write such regular expressions. In contrast, aspects described herein do not require input from the end user with the exception of a relatively small subset of the datapoints labelled correct/erroneous.

Additionally, aspects described herein differ from conventional approaches applying qualitative methods that characterize data by using pattern mining techniques. Pattern mining aims at identifying rules that describe specific patterns within the data. For example, pattern mining can relate specific values for the CITY column with other values of the STATE column. Pattern mining approaches discover the syntactic and semantic characterizations of the data. One technique for pattern discovery is inducing functional dependencies among data. Functional dependencies are considered as a particular form of denial constraints and commonly used to specify business rules. For example, tuples with the same zip code must share the same city name. Research has studied the repeated patterns in the data and formalize them in the form of functional dependencies to suggest better repairs. Another approach focuses on deriving such dependencies with the presence of erroneous data and introduces a new class of integrity constraints that can grab the dependencies between data attributes even if a portion of the attributes does not comply with these dependencies. However, these methods focus only on specific types of errors. Their performance is not guaranteed in many situations in which diverse kinds of errors coexist in the same database. For example, no pattern mining approach can be robust to simple typographical errors. Also, pattern mining approaches are computationally expensive due to the enormous search space.

Quantitative methods employ statistical techniques to identify unusual behaviors in the data. Outlier detection is an example. Data modeling approaches such as Gaussian mixture models and histogram modeling can be applied to detect outliers in numerical data. Additionally, machine learning techniques, such as unsupervised learning and active learning can be used to detect outliers in relational databases. For example, one approach uses a technique to learn a model for outlier detection using Bayesian networks. The method integrates model mining with statistical-relational learning to detect outliers in relational data. However, outlier detection methods require precise identification of outlier thresholds. Existing thresholding techniques rely on statistics, which make them considerably biased when dealing with data with a high number of outliers. Also, end-user input may be needed to evaluate the choice of these thresholds, which can be a time-consuming and expensive task.

Figure 3:
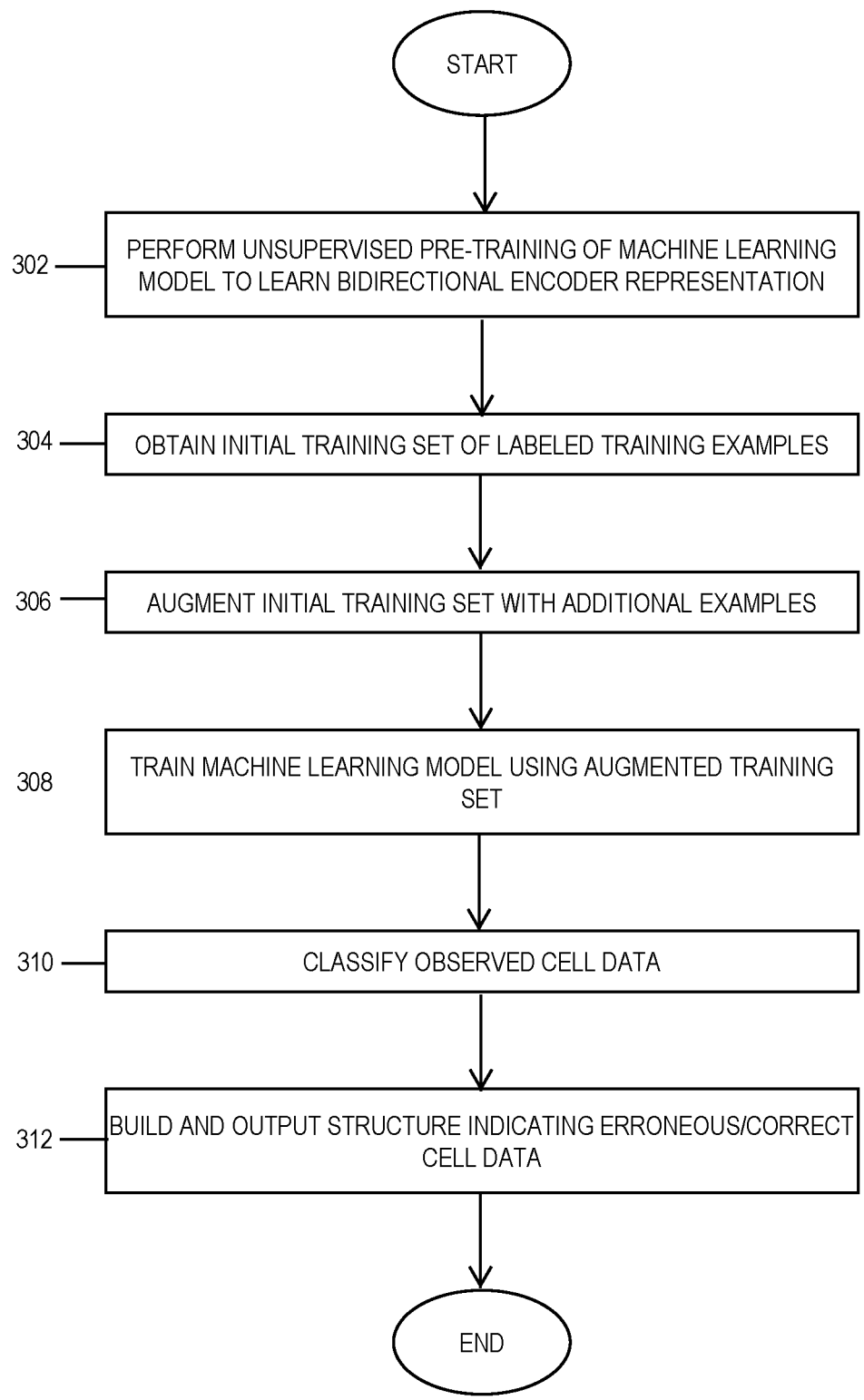
FIG. 3 depicts an example process for classification of erroneous cell data in accordance with aspects described herein.

FIG. 3 depicts an example process for classification of erroneous cell data in accordance with aspects described herein. In some examples, the process is performed by one or more computer systems, such as those described herein. The process begins by performing (302) unsupervised pre-training of a machine learning model to learn a representation of data cells of the dataset. In particular examples, the representation is a bidirectional encoder of the data. Additionally the data cells may be in tabular data of the dataset. The pre-training includes training the machine learning model to predict cell data based on entity attributes (attributes of the entity of which the cell is a part). In some examples, training the machine learning model to predict cell data based on entity attributes includes selecting and masking a plurality of cells of the dataset, and for each masked cell of the plurality of cells, training the machine learning model to predict cell data for that masked cell given cell data for other attributes of an entity to which the cell corresponds.

Training the machine learning model to predict cell data can further include generating dependency rules, where each dependency rule relates a set of given input attributes for an entity, as input, to a predicted data value, as output, for another attribute of that entity.

The process continues by obtaining (304) an initial training set for training the machine learning model to classify cell data. The initial training set includes labeled training examples that correlate observed cell data to correct cell data. The process then automatically augments (306) the initial training set to produce an augmented training set. This augmenting can include identifying patterns in the labeled training examples and generating from the identified patterns transformation functions for augmenting the initial training set, and then, using the transformation functions, learning an augmentation strategy and automatically generating additional training examples that correlate erroneous data values to correct data values as informed by the transformation functions. The augmented training set therefore includes the labeled training examples of the initial training set and the generated additional training examples.

Learning the augmentation strategy determines how to apply the transformation functions to data of the labeled training examples. Generating a transformation function can then include extracting, based on examining one or more of the labeled training examples, a function (i.e. the transformation function being generated) that operates on correct cell data to produce observed cell data. To automatically generate an additional training example, the process applies the transformation function to a selected correct data value (e.g. one that the process selects for which an erroneous data point is to be generated) according to the learned augmentation strategy to transform the selected correct data value to an erroneous data value. The process correlates that erroneous data value to the selected correct data value to provide the additional training example.

Using the augmented training set, the process trains (308) the machine learning model to classify observed cell data based on a comparison between the observed cell data and data that the machine learning model predicts. The process then classifies (310) observed cell data, such as one or more cells of the dataset for which the representation of data cells was learned in 302. The classifying includes, for each cell of the one or more cells, using the mode to predict cell data for that cell, then comparing the predicted cell data to the observed cell data in that cell, and identifying from the comparing whether the observed cell data is erroneous.

Based on observed cell data of a cell of the dataset being missing, such that the cell has no cell data, and based further on the machine learning model predicting cell data for that cell, the classifying the observed cell data of the cell classifies the cell data of the cell to be erroneous.

Additionally, the process of FIG. 3 includes building and outputting (312) a data structure resulting from the classifying (310). The data structure can indicate, for each cell of the one or more cells of the dataset, a value selected from the group consisting of: (i) a first value indicating that the cell data of the cell is erroneous, and (ii) a second value indicating that the cell data of the cell is correct.

Although various examples are provided, variations are possible without departing from a spirit of the claimed aspects.

Figure 4:
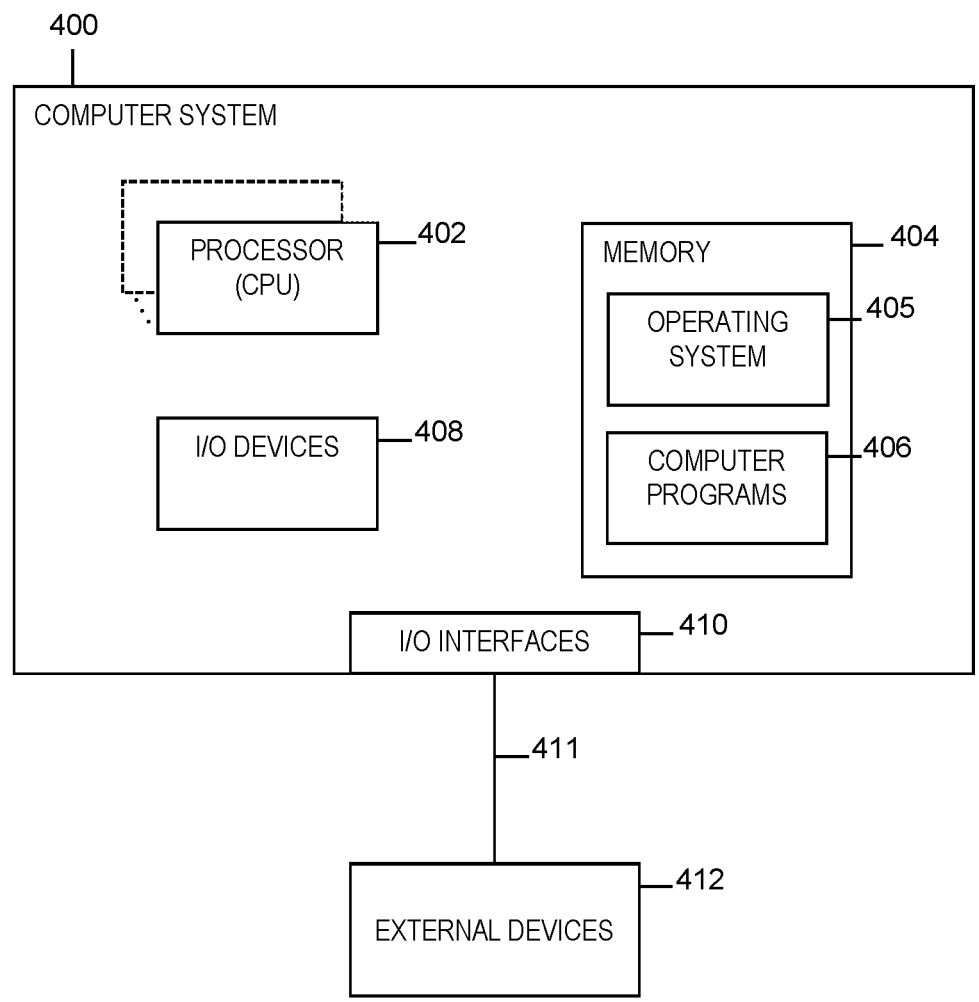
FIG. 4 depicts one example of a computer system and associated devices to incorporate and/or use aspects described herein.

Processes described herein may be performed singly or collectively by one or more computer systems. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
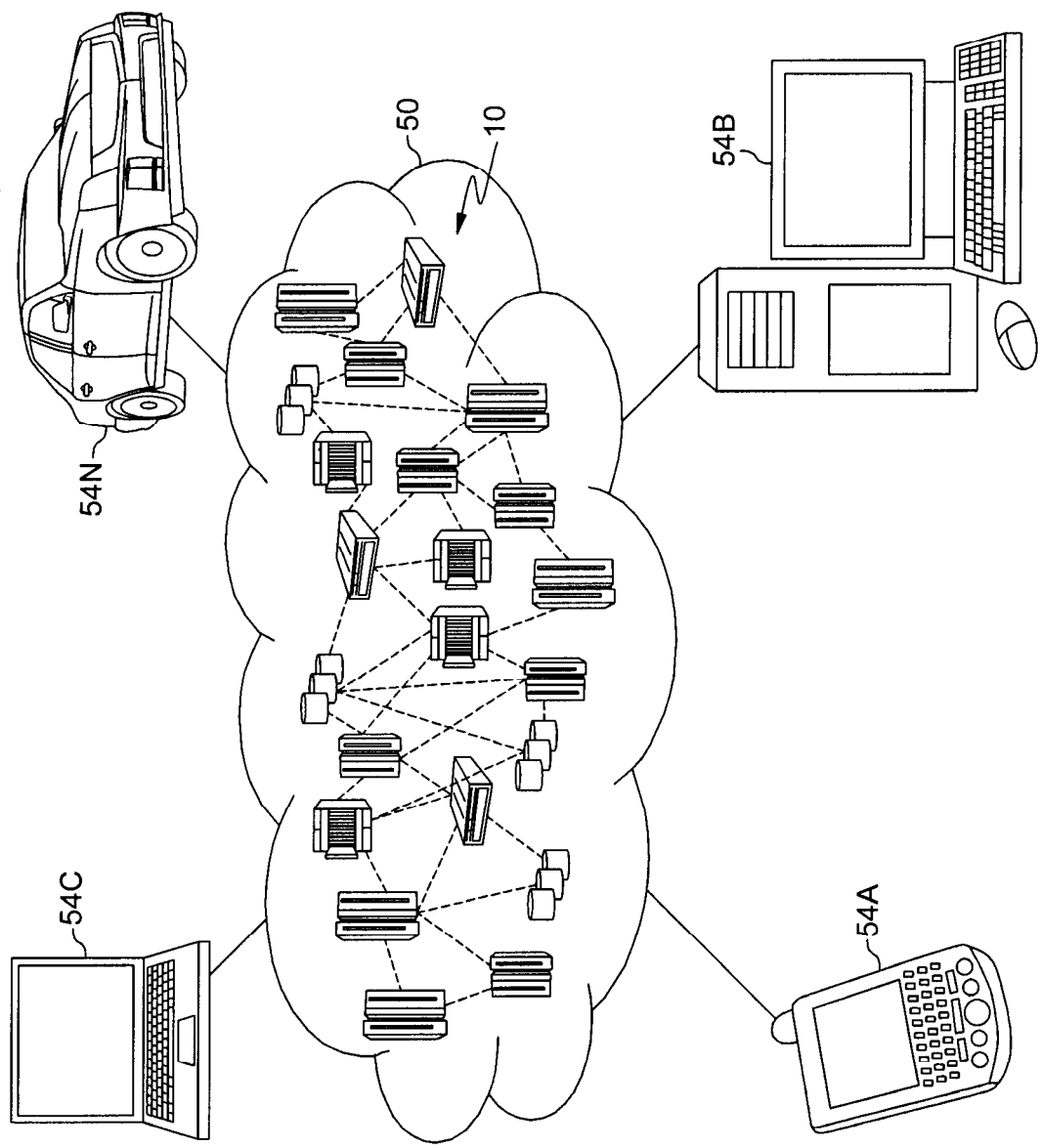
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
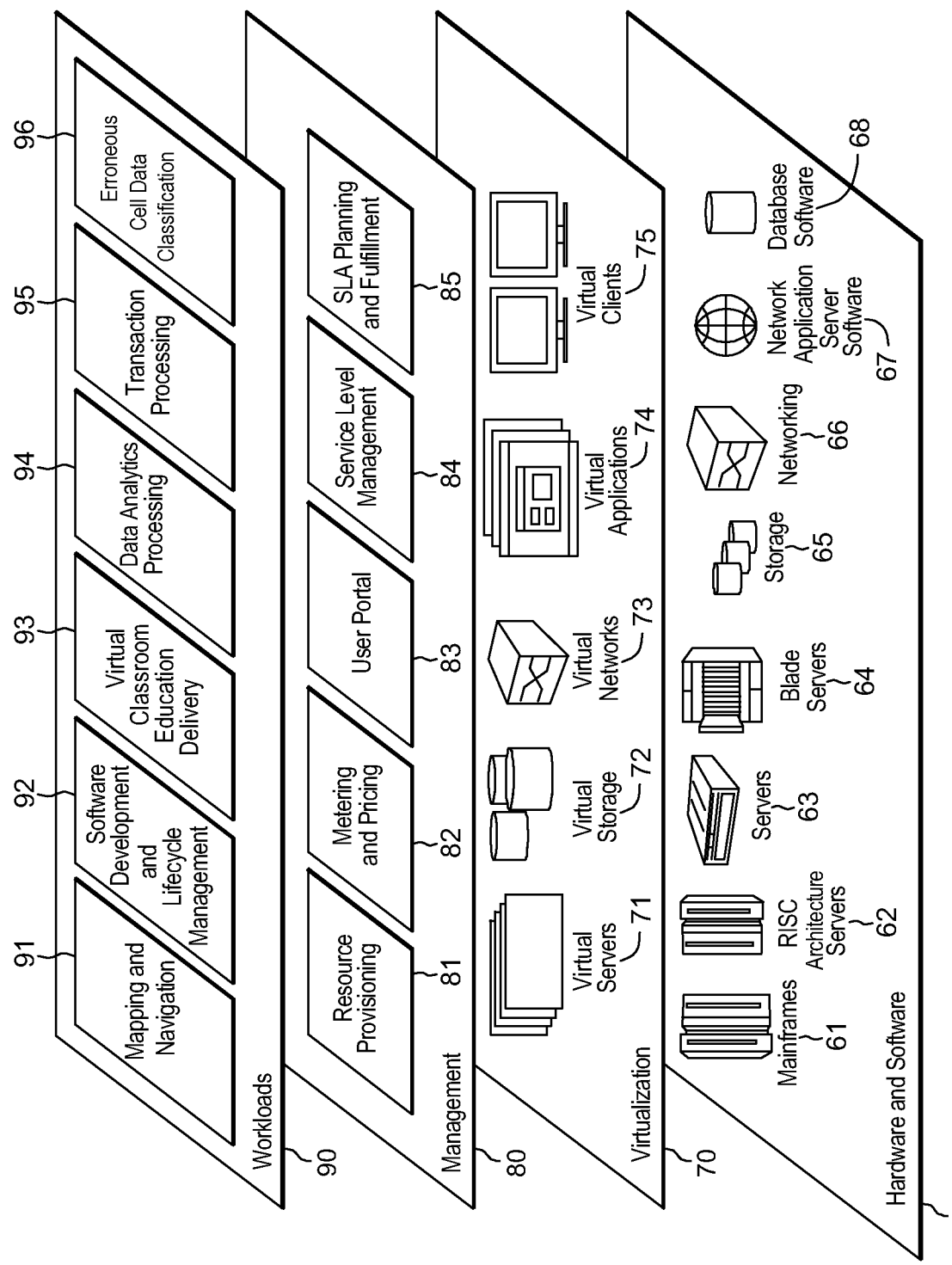
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and erroneous cell data classification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   automatically generating, using at least one transformation function determined based on correlations of observed cell data to correct cell data, training examples that correlate (i) incorrect data values of cells to (ii) correct data values for the cells, as informed by the at least one transformation function;
   augmenting an initial training set of labeled training examples with the generated training examples, wherein the augmenting produces an augmented training set;
   training a machine learning model using the augmented training set, wherein the training trains the machine learning model to classify observed cell data based on a comparison between the observed cell data and data that the machine learning model predicts; and
   classifying observed cell data using the machine learning model, wherein the classifying comprises, for each cell of one or more cells of a dataset: predicting cell data for that cell, comparing the predicted cell data to the observed cell data in that cell, and identifying from the comparing whether the observed cell data is incorrect based on the predicted cell data for that cell that was predicted by the predicting.

2. The method of claim 1, further comprising identifying patterns in the labeled training examples and generating from the identified patterns the at least one transformation function for augmenting the initial training set.

3. The method of claim 2, wherein the labeled training examples correlate observed cell data to correct cell data.

4. The method of claim 1, wherein the using the at least one transformation function to automatically generate the training examples comprises applying a transformation function of the at least one transformation function to a selected correct data value to transform the selected correct data value to an incorrect data value, and correlating the incorrect data value to the selected correct data value to provide an additional training example of the training examples.

5. The method of claim 1, wherein based on observed cell data of a cell of the dataset being missing, such that the cell has no cell data, and based further on the machine learning model predicting cell data for that cell, the classifying the observed cell data of the cell classifies the cell data of the cell to be incorrect.

6. The method of claim 1, further comprising building and outputting a data structure indicating, for each cell of the one or more cells of the dataset, a value selected from the group consisting of: (i) a first value indicating that the cell data of the cell is incorrect, and (ii) a second value indicating that the cell data of the cell is correct.

7. A computer system comprising:
a memory; and
a processor in communication with the memory, wherein the computer system is configured to perform
a method comprising:
automatically generating, using at least one transformation function determined based on correlations of observed cell data to correct cell data, training examples that correlate (i) incorrect data values of cells to (ii) correct data values for the cells, as informed by the at least one transformation function;
augmenting an initial training set of labeled training examples with the generated training examples, wherein the augmenting produces an augmented training set;
training a machine learning model using the augmented training set, wherein the training trains the machine learning model to classify observed cell data based on a comparison between the observed cell data and data that the machine learning model predicts; and
classifying observed cell data using the machine learning model, wherein the classifying comprises, for each cell of one or more cells of a dataset: predicting cell data for that cell, comparing the predicted cell data to the observed cell data in that cell, and identifying from the comparing whether the observed cell data is incorrect based on the predicted cell data for that cell that was predicted by the predicting.

8. The computer system of claim 7, wherein the method further comprises identifying patterns in the labeled training examples and generating from the identified patterns the at least one transformation function for augmenting the initial training set.

9. The computer system of claim 8, wherein the labeled training examples correlate observed cell data to correct cell data.

10. The computer system of claim 7, wherein the using the at least one transformation function to automatically generate the training examples comprises applying a transformation function of the at least one transformation function to a selected correct data value to transform the selected correct data value to an incorrect data value, and correlating the incorrect data value to the selected correct data value to provide an additional training example of the training examples.

11. The computer system of claim 7, wherein based on observed cell data of a cell of the dataset being missing, such that the cell has no cell data, and based further on the machine learning model predicting cell data for that cell, the classifying the observed cell data of the cell classifies the cell data of the cell to be incorrect.

12. The computer system of claim 7, wherein the method further comprises building and outputting a data structure indicating, for each cell of the one or more cells of the dataset, a value selected from the group consisting of: (i) a first value indicating that the cell data of the cell is incorrect, and (ii) a second value indicating that the cell data of the cell is correct.

13. A computer program product comprising:
a computer readable storage medium readable by a processing circuit and storing instructions for execution by the processing circuit for performing a method comprising:
automatically generating, using at least one transformation function determined based on correlations of observed cell data to correct cell data, training examples that correlate (i) incorrect data values of cells to (ii) correct data values for the cells, as informed by the at least one transformation function;
augmenting an initial training set of labeled training examples with the generated training examples, wherein the augmenting produces an augmented training set;
training a machine learning model using the augmented training set, wherein the training trains the machine learning model to classify observed cell data based on a comparison between the observed cell data and data that the machine learning model predicts; and
classifying observed cell data using the machine learning model, wherein the classifying comprises, for each cell of one or more cells of a dataset: predicting cell data for that cell, comparing the predicted cell data to the observed cell data in that cell, and identifying from the comparing whether the observed cell data is incorrect based on the predicted cell data for that cell that was predicted by the predicting.

14. The computer program product of claim 13, wherein the method further comprises identifying patterns in the labeled training examples and generating from the identified patterns the at least one transformation function for augmenting the initial training set.

15. The computer program product of claim 14, wherein the labeled training examples correlate observed cell data to correct cell data.

16. The computer program product of claim 13, wherein the using the at least one transformation function to automatically generate the training examples comprises applying a transformation function of the at least one transformation function to a selected correct data value to transform the selected correct data value to an incorrect data value, and correlating the incorrect data value to the selected correct data value to provide an additional training example of the training examples.

17. The computer program product of claim 13, wherein based on observed cell data of a cell of the dataset being missing, such that the cell has no cell data, and based further on the machine learning model predicting cell data for that cell, the classifying the observed cell data of the cell classifies the cell data of the cell to be incorrect.

* * * * *